W. BOTTOMLEY.
BALING PRESS.
APPLICATION FILED MAR. 26, 1914.

1,125,451. Patented Jan. 19, 1915.
4 SHEETS—SHEET 1.

Witnesses:

Inventor.
Wilfred Bottomley
by Herbert W. Jenner.
Attorney.

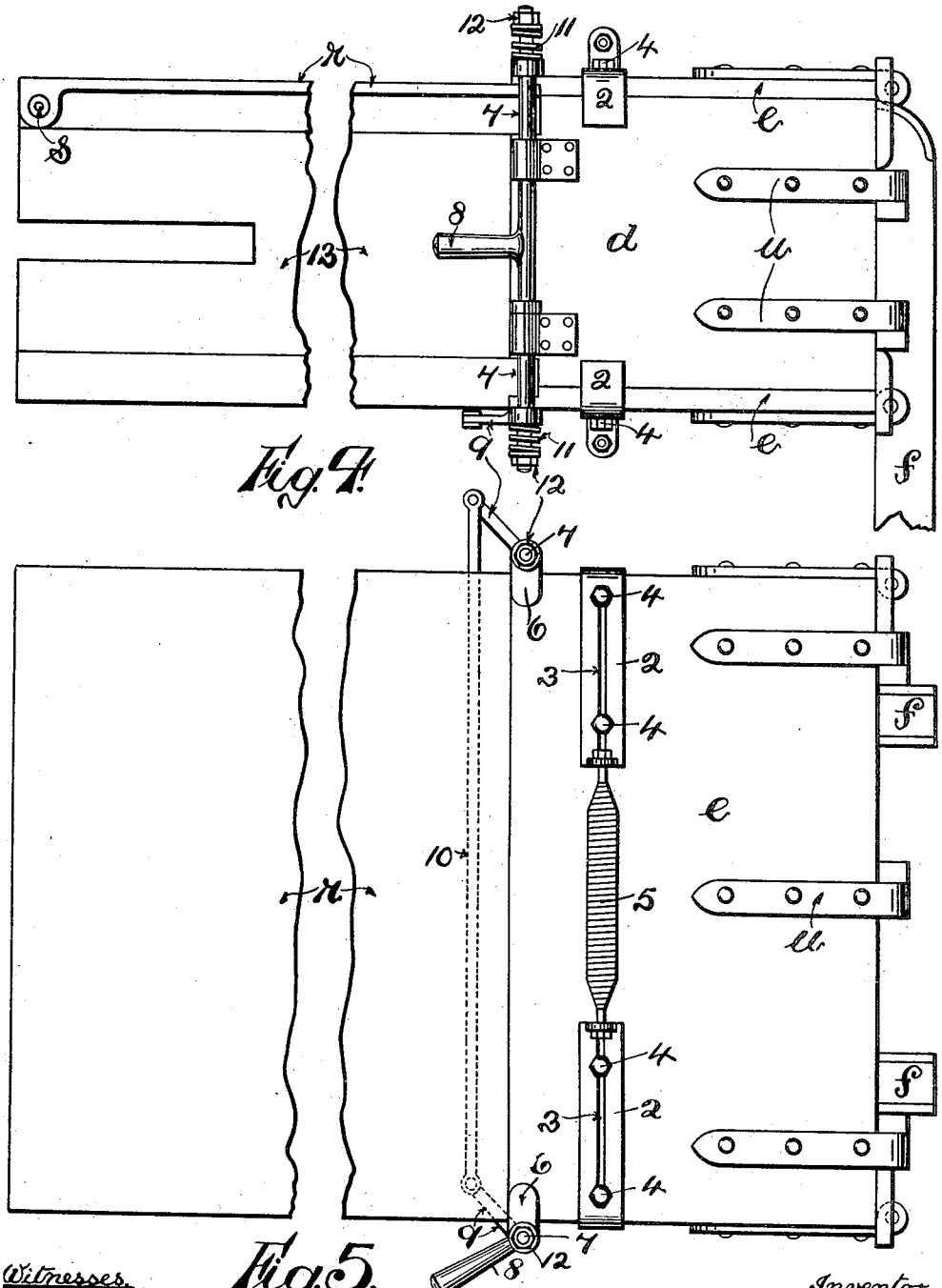

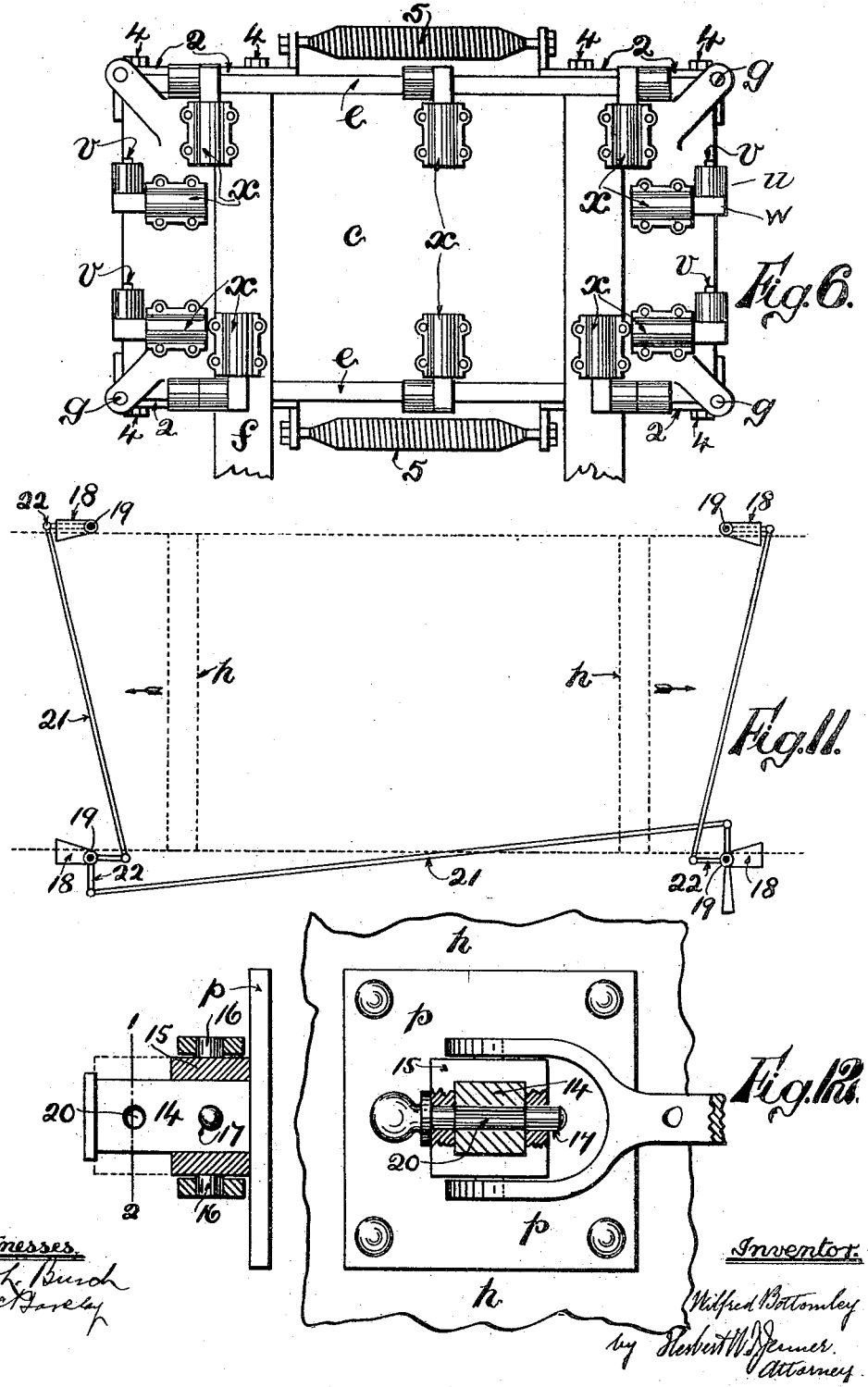

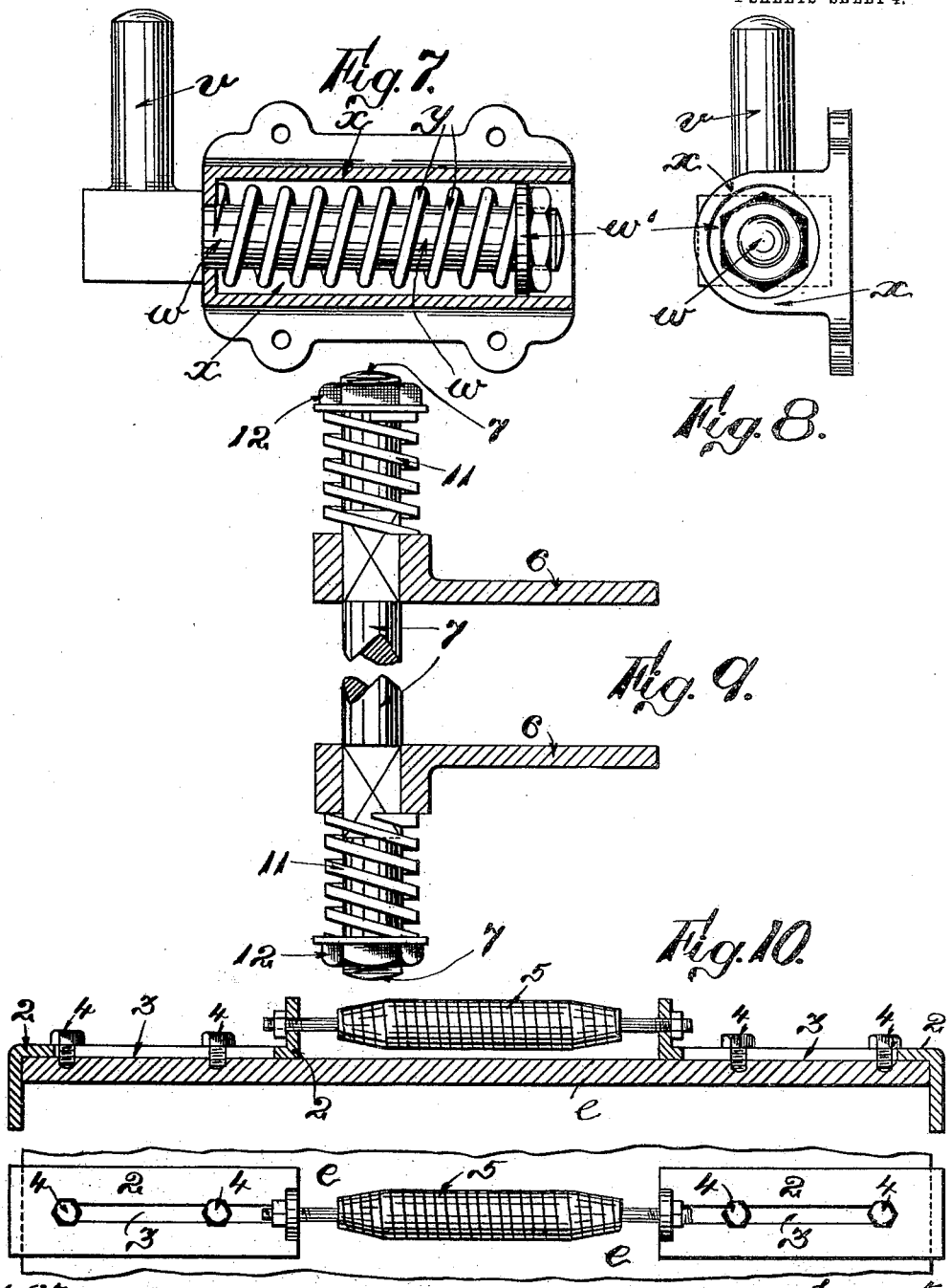

UNITED STATES PATENT OFFICE.

WILFRED BOTTOMLEY, OF MANCHESTER, ENGLAND.

BALING-PRESS.

1,125,451.  Specification of Letters Patent.  Patented Jan. 19, 1915.

Application filed March 26, 1914. Serial No. 827,376.

*To all whom it may concern:*

Be it known that I, WILFRED BOTTOMLEY, subject of the King of Great Britain and Ireland, and resident of Manchester, in the county of Lancaster, England, cotton merchant, have invented certain new and useful Improvements in Baling-Presses, of which the following is a specification.

My invention has reference to that type of baling press comprising a press box at each end of a frame, a follower in each press box, toggle arms coupled to each follower and to two traversing nuts mounted upon a right and left hand central screw carried upon a floating bed plate supported by the frame, said screw being rotated by hand or power means so as to traverse the nuts upon it to move the followers toward and from the fixed heads or abutments of the press boxes.

In the aforesaid type of press my object is to provide an improved general arrangement of mechanism; means for allowing the sides and top and bottom of each press box moving outwardly under a predetermined pressure consisting of spring-controlled hinges and spring-controlled catch devices carried by the press box elements themselves; means for enabling an additional pressure to be put upon the material to be compressed consisting in spring-controlled catches operated by and adapted to hold the movable heads in a fixed position and slidable collar mechanism connected to the toggle arms and to brackets carried by the movable heads so that said collars can be moved from one position and be held in another by pins and catch devices to hold the followers in position after partial compression of the material in the boxes until the inner ends of the toggle arms have been readjusted to a new thrusting position prior to final compression of the material.

Figure 1:
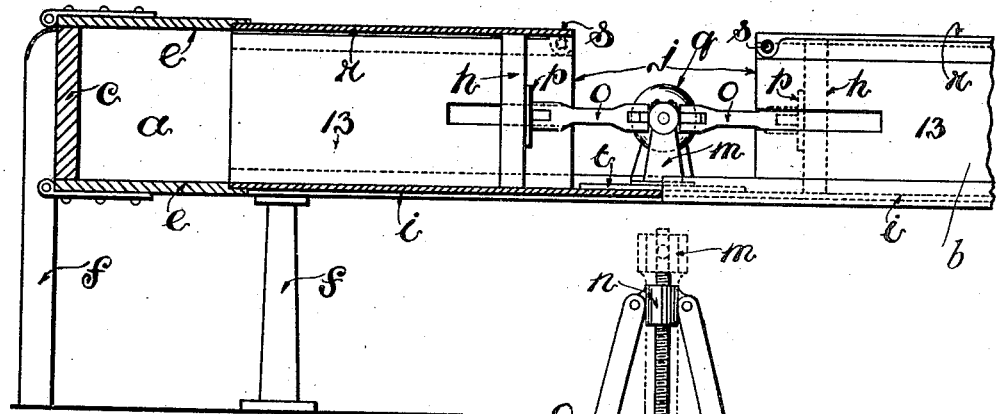
Figure 2:
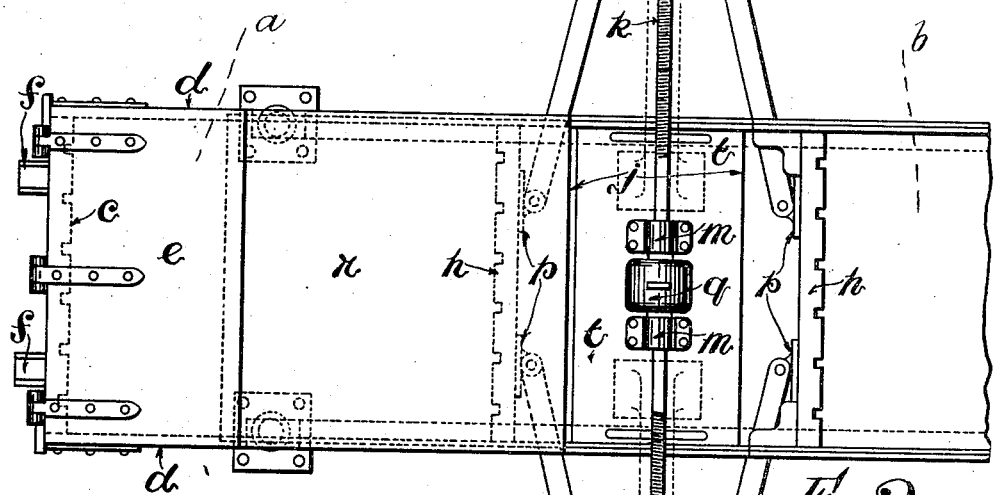
Figure 3:
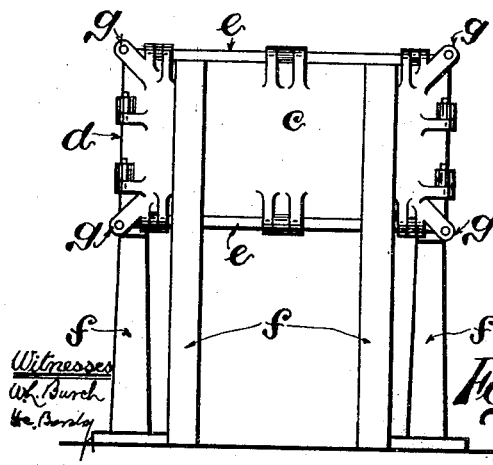

My invention will be fully described with reference to the accompanying drawings in which, Figure 1 is a side elevation of a press constructed in accordance with my invention, Fig. 2 plan of same, Fig. 3 end elevation, Fig. 4 side elevation to an enlarged scale of one press box showing the manner of arranging the sides and top and bottom of the box, Fig. 5 plan of Fig. 4 and Fig. 6 end elevation of same. Fig. 7 elevation partly in section to an enlarged scale showing one of the hinges employed in the press boxes, Fig. 8 front elevation of same, Fig. 9 elevation partly in section showing a catch arrangement hereinafter referred to, Fig. 10 sectional elevation and plan respectively of another catch arrangement for the press boxes, Fig. 11 plan of a catch device for the movable press heads hereinafter referred to and Fig. 12 side and front elevations respectively of a modified form of connecting the toggle arms to the press heads.

In accordance with my invention I provide two press boxes $a$ and $b$ composed each of a stationary end $c$ hinged sides $d$ and hinged top and bottom $e$, such parts being hinged or suitably pivoted to the stationary end of the box. Such stationary end of each box is supported by end pillars $f$ which may be arranged vertically or at an inclination as is found most suitable. Lugs $g$ are formed on the end plates $c$ of the press chamber, for the connection of any suitable braces or stay-rods.

The boxes $a$ and $b$ are supported on a suitable framework $i$ and their open ends $j$ to face each other at some little distance apart, each end being fitted with a movable press head $h$ previously referred to. Both heads are operated by mechanical means which consists of a screw $k$ provided with right and left hand threads, suitably supported in bearings $m$ between the boxes and provided with two nuts $n$ to each of which is coupled a pair of toggle arms $o$, the inner ends of which are, in turn, coupled to the movable press heads, by brackets $p$. The screw is adapted to be rotated by hand or from a suitable source of power, the casing of an electric motor $q$ being indicated in Figs. 1 and 2 so that the nuts may be traversed inwardly toward each other on the screw, drawing the outer ends of the toggle arms or links together and simultaneously forcing their inner ends within the press boxes and advancing the movable press heads toward the fixed ends of the press boxes and so compressing the material which has previously been placed in the latter. The material to be compressed is inserted in the press chambers by raising the hinged top doors $e$ and $r$. When the screw is driven by power the driving mechanism may be provided with a reversing motion of a suitable type for returning the movable press heads to their initial positions.

The bearings carrying the operating screw are mounted upon a bed plate or frame $t$ which is in turn supported by the main framework $i$ of the press and is so arranged that it can move longitudinally of the press frame so that the pressure of the toggle elements may be equalized between the two boxes or the material contained in them. That is to say, if there is a greater pressure or density of material in one box the mechanical pressure set up will tend to re-act and move the bed plate toward the opposite box until the pressure at both ends is equalized. The bed plate may be suitably guided in the frame $i$ for the purpose referred to.

It has previously been mentioned that the sides and top and bottom of the press boxes $a$ and $b$ are hinged. They may be simply hinged with ordinary hinges, but I prefer to provide an arrangement of hinges and catches which will allow of the sides and top and bottom of the boxes giving way when a pre-determined pressure has been reached within each box so that no damage can result to the pressed boxes. With this object in view the hinge plates $u$ are pivoted to studs $v$ shown in Figs. 4 to 8; such studs being connected to slidable shanks $w$ passing into spring boxes $x$ fixed to the ends of the press boxes. Springs $y$ surround the shanks one end of each bearing against the inside of the box and the other end against an adjustable collar or washer $w^1$. Each spring can therefore be adjusted to withstand a given pressure, the whole of them acting against the pressure exerted outwardly from within the press box. The opposite ends of the sides and top and bottom of the press boxes are held in position by spring connections of a somewhat different kind to the spring hinges. Thus the sides of the boxes are held in position by catch plates 2 provided with slots 3 and slidably secured by setscrews 4 to the tops and bottoms of the boxes, the ends of the plates being bent downwardly to engage with the box sides while their inner ends are coupled by springs 5 which are regulated to resist the same pressure as the hinges. The top and bottom of each box are held in position by catches 6 slidably secured on the ends of shafts or rods 7 but so that they may be turned by such shafts either into or out of position for securing or releasing the top and bottom of the box. The turning may be effected by means of a lever handle 8, arms 9 and a link 10 coupling the latter together. Springs 11 adjustable to the required pressure are located between the catches and the adjusting nuts 12. The arrangement of spring hinges and spring catches provide for the sides and tops and bottoms of the boxes giving way under excessive pressure the spring catch devices enabling the whole of the hinged parts to be opened when required or to be held in working position, thus allowing of the compressed bales to be removed either from the sides or from the top or bottom as is found most suitable. The hinged lids $r$, serve to enable the material to be compressed to be placed in the forward ends of the boxes. The remaining portions of the forward ends of the boxes are inclosed by plates or the like 13, the side plates being arranged to allow of the requisite movement of the toggle arms. The catch devices for the top and bottom of the press boxes also secure the hinged lids $r$ in position during compression of the material.

Figs. 11 and 12 illustrate the means employed for enabling the movable press heads to be held in position after a certain amount of pressure has been exerted in order to allow of the inner ends of the toggle arms to be drawn back to get another grip of the connecting means and then exert a final and greater pressure. For this purpose the movable press heads are provided with brackets $p$ having extended studs 14 surrounded by collars 15 of a slidable character having trunnions 16 to which the inner ends of the toggle arms are connected by being forked as shown in Fig. 12. During ordinary compression the collars bear against the bases of the brackets $p$ and may be held in that position by pins passed through holes 17. When the movable press heads shown in broken lines are being pushed forward during this ordinary compression they are adapted to press outwardly spring-controlled catches 18 (Fig. 11) mounted on vertical shafts 19. So soon as the press heads get beyond the catches they spring back into the position indicated in Fig. 11 and hold the press heads while the operating screw is reversed; the pins withdrawn from the holes 17 and the collars 15 brought back to the broken line position shown in Fig. 12 and there held by the insertion of the pins in the additional holes 20. The screw can then be operated to give the extra pressure required. The whole of the catches 16 can be operated simultaneously through the agency of links 21 and arms 22. If required the movement of the press heads toward the fixed heads of the press boxes may be adapted to release the catches which are employed for holding the sides and tops and bottoms of the boxes together so that the bales are released and allowed to fall out at the underside.

What I claim as my invention and desire to secure by Letters Patent is:—

1. In a press, the combination, with two press chambers arranged in line with each other and provided with stationary outer ends and yielding side portions, of stationary pillars secured to the said outer ends, a frame extending between the said pillars and supporting the main portions of the press chambers, press heads slidable in the press chambers, coupling pins secured to the press heads and arranged longitudinally of the press chambers, operating mechanism provided with fastening devices for connecting it to the said coupling pins at different points of their length, said mechanism being adapted to slide the press heads in opposite directions, and rectractable catches pivoted to the press chambers and engaging automatically with the press heads at predetermined points of their compression strokes.

2. In a press, the combination, with a stationary end plate, of spring chambers secured to the end plate, press sides, hinge plates secured to the rear portions of the press sides, slidable rods pivoted to the hinge plates, springs arranged in the spring chambers and connected to the said rods, and yielding connections for holding the front end portions of the press sides in place.

3. In a press, the combination, with a stationary end plate, press sides, and spring-pressed hinges connecting the rear end portions of the press sides with the said end plate; of slidable catch plates engaging with the front end portions of the opposed press sides, guides for the said catch plates, and springs secured between the adjacent end portions of the catch plates and permitting the press sides to move apart when the pressure of the material between them is excessive.

In testimony whereof I have hereunto set my hand in the presence of two witnesses.

WILFRED BOTTOMLEY.

Witnesses:
 WILLIAM H. TAYLOR,
 MALCOLM SINEHURST.

Copies of this patent may be obtained for five cents each, by addressing the "Commissioner of Patents, Washington, D. C."